United States Patent

Goel et al.

(10) Patent No.: US 9,489,528 B2
(45) Date of Patent: Nov. 8, 2016

(54) SINGLE USE RECOVERY KEY

(75) Inventors: Sachin Goel, Bellevue, WA (US); Stein Erik Dolan, Bellevue, WA (US); William B. Lees, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 278 days.

(21) Appl. No.: 13/316,587

(22) Filed: Dec. 12, 2011

(65) Prior Publication Data

US 2013/0148810 A1 Jun. 13, 2013

(51) Int. Cl.
*H04L 9/08* (2006.01)
*G06F 21/62* (2013.01)

(52) U.S. Cl.
CPC .......... *G06F 21/6209* (2013.01); *H04L 9/0891* (2013.01); *G06F 2221/2131* (2013.01)

(58) Field of Classification Search
CPC .......................... G06F 21/6209; H04L 9/0891
USPC .......................... 713/180–183; 380/277–279
See application file for complete search history.

(56) References Cited

U.S. PATENT DOCUMENTS

| | | | |
|---|---|---|---|
| 6,643,670 B2 | 11/2003 | Parham et al. | |
| 6,654,771 B1 | 11/2003 | Parham et al. | |
| 7,831,833 B2 | 11/2010 | Gaylor | |
| 7,929,706 B2 | 4/2011 | Li | |
| 2002/0120637 A1 | 8/2002 | Parham et al. | |
| 2006/0085845 A1 | 4/2006 | Davis et al. | |
| 2006/0129830 A1* | 6/2006 | Haller ............... | G06F 21/31 713/183 |
| 2006/0294378 A1* | 12/2006 | Lumsden et al. ........ | 713/171 |
| 2007/0033418 A1* | 2/2007 | Okawa ..................... | 713/192 |
| 2007/0101434 A1* | 5/2007 | Jevans ....................... | 726/26 |
| 2007/0113078 A1* | 5/2007 | Witt et al. ................ | 713/165 |
| 2007/0127719 A1* | 6/2007 | Selander et al. ......... | 380/277 |
| 2008/0232593 A1* | 9/2008 | Hsu et al. ................ | 380/277 |
| 2009/0052669 A1* | 2/2009 | Ma ............................. | 380/277 |
| 2009/0276844 A1* | 11/2009 | Gehrmann et al. ........ | 726/16 |
| 2010/0031063 A1* | 2/2010 | Fascenda ......... | G06F 11/1458 713/193 |
| 2010/0037030 A1* | 2/2010 | Kassai .............. | G06F 21/554 711/161 |
| 2010/0154053 A1* | 6/2010 | Dodgson et al. ......... | 726/19 |
| 2010/0175116 A1* | 7/2010 | Gum ............................ | 726/6 |
| 2010/0202617 A1 | 8/2010 | Balakrishnan et al. | |
| 2010/0303240 A1* | 12/2010 | Beachem ............ | G06F 21/57 380/277 |
| 2011/0004758 A1* | 1/2011 | Walker et al. ............ | 713/168 |
| 2011/0276806 A1* | 11/2011 | Casper et al. ............ | 713/189 |
| 2012/0009954 A1* | 1/2012 | Gadiraju et al. ......... | 455/466 |

OTHER PUBLICATIONS

Zuo et al., "TPM Based Key Backup and Recovery," 2007 International Conference on Machine Learning and Cybernetics Year: 2007, vol. 4 pp. 2164-2167.*

(Continued)

*Primary Examiner* — Roderick Tolentino
(74) *Attorney, Agent, or Firm* — Henry Gabryjelski; Kate Drakos; Micky Minhas

(57) ABSTRACT

Aspects of the subject matter described herein relate to disclosing recovery keys. In aspects, when a recovery key is disclosed, data is updated to indicate that the recovery key has been disclosed. A machine that has locked data may determine whether a recovery key for the locked data has been disclosed and whether a new key needs to be generated for the locked data. If a new key needs to be generated for the locked data, the machine may generate the new key and send it to a recovery store for storage. In addition, old keys that protect the locked data may be deleted after the new key has been generated and stored.

25 Claims, 5 Drawing Sheets

(56) References Cited

OTHER PUBLICATIONS

Kanyamee et al., "High-Availability Decentralized Multi-Agent Key Recovery System," Computer and Information Science, 2009. ICIS 2009. Eighth IEEE/ACIS International Conference on Year: 2009 pp. 290-294.*

"Planning for Single Use Recovery Keys", Retrieved at <<http://onlinehelp.microsoft.com/en-us/mdop/hh301925.aspx>>, Retrieved Date: Oct. 10, 2011, p. 1.

Rose, Stephen L, "Simplify BitLocker Support with MBAM", Retrieved at <<http://windowsteamblog.com/windows/b/springboard/archive/2011/07/01/simplify-bitlocker-support-with-mbam.aspx>>, Jul. 1, 2011, pp. 3.

"BitLocker Drive Encryption Operations Guide: Recovering Encrypted Volumes with AD DS", Retrieved at <<http://technet.microsoft.com/en-us/library/cc771778(WS.10).aspx>>, Retrieved Date: Oct. 10, 2011, pp. 33.

"Infrastructure Independent Recovery Key Release", U.S. Appl. No. 13/310,813, filed Dec. 5, 2011, pp. 59.

* cited by examiner

SINGLE USE RECOVERY KEY

BACKGROUND

Some operating systems and other programs have the capability of encrypting data of a volume. This helps ensure that only the person(s) who knows the appropriate security codes is able to access data on the volume—even if the computer hosting the volume is stolen. A problem occurs, however, when legitimate stakeholders of the volume are not able to access the data on the volume. For example, if a volume is encrypted and a user of the volume forgets security codes for the volume, it may be computationally infeasible to calculate the security codes and thus decrypt the data of the volume. Relatedly, having a security code fall into the wrong hands may allow an unauthorized user to gain access to the encrypted data of the volume.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to disclosing recovery keys. In aspects, when a recovery key is disclosed, data is updated to indicate that the recovery key has been disclosed. A machine that has locked data may determine whether a recovery key for the locked data has been disclosed and whether a new key needs to be generated for the locked data. If a new key needs to be generated for the locked data, the machine may generate the new key and send it to a recovery store for storage. In addition, old keys that protect the locked data may be deleted after the new key has been generated and stored.

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. In particular, in the claims a reference to an item generally means at least one such item is present and a reference to an action means at least one instance of the action is performed.

Sometimes herein the terms "first", "second", "third" and so forth may be used. Without additional context, the use of these terms in the claims is not intended to imply an ordering but is rather used for identification purposes. For example, the phrase "first version" and "second version" does not necessarily mean that the first version is the very first version or was created before the second version or even that the first version is requested or operated on before the second versions. Rather, these phrases are used to identify different versions.

Headings are for convenience only; information on a given topic may be found outside the section whose heading indicates that topic.

Other definitions, explicit and implicit, may be included below.

Exemplary Operating Environment

Figure 1:
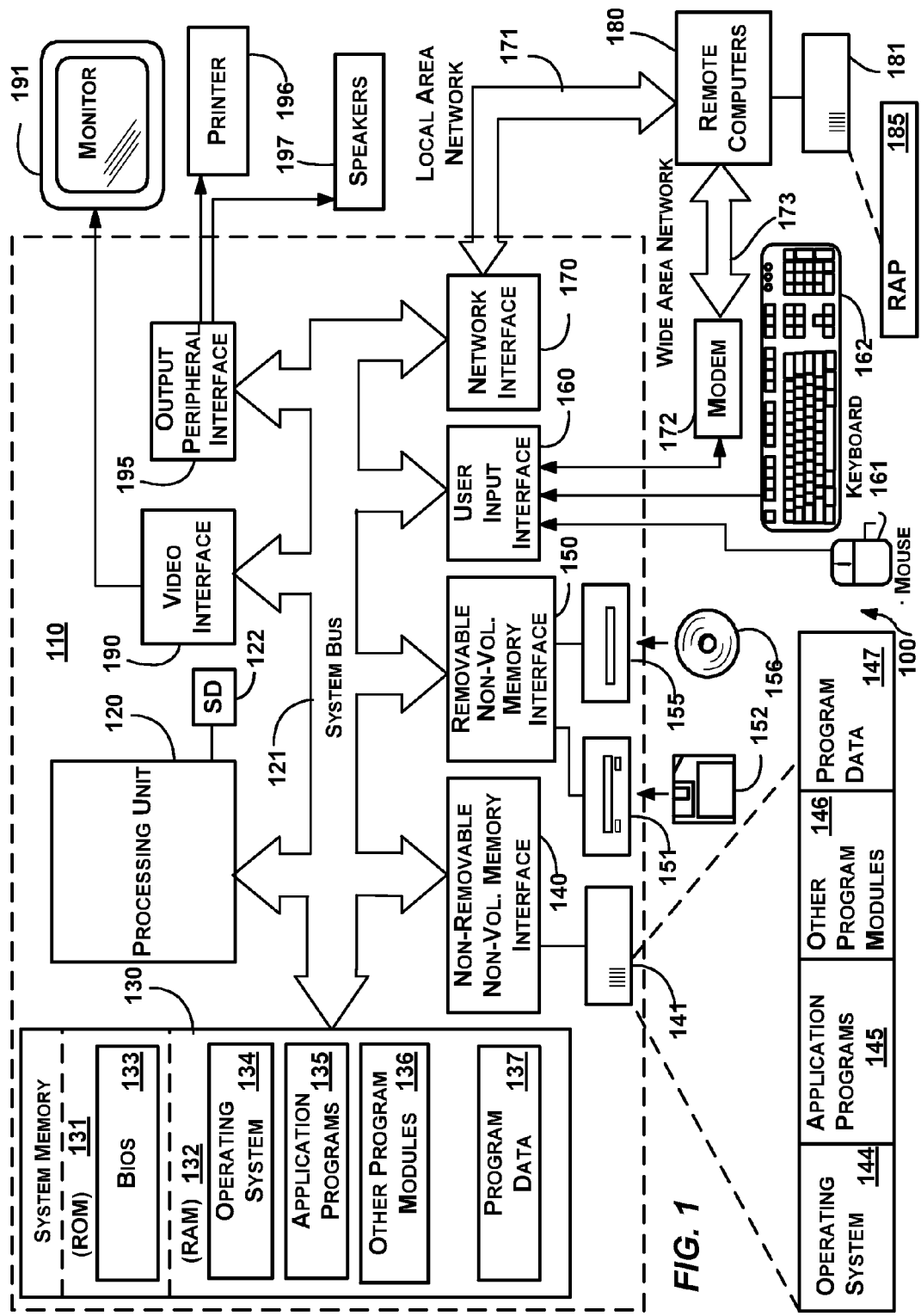
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The processing unit 120 may be connected to a hardware security device 122. The security device 122 may store and be able to generate cryptographic keys that may be used to secure various aspects of the computer 110. In one embodiment, the security device 122 may comprise a Trusted Platform Module (TPM) chip, TPM Security Device, or the like.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, solid state storage, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards and other solid state storage devices, digital versatile discs, other optical discs, digital video tape, solid state RAM, solid state ROM, and the like. The hard disk drive 141 may be connected to the system bus 121 through the interface 140, and magnetic disk drive 151 and optical disc drive 155 may be connected to the system bus 121 by an interface for removable non-volatile memory such as the interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Recovery Key

As mentioned previously, losing the security codes of an encrypted volume may cause a stakeholder of the volume to lose the ability to decrypt encrypted data of the volume. Relatedly, having a security code fall into the wrong hands may allow an unauthorized user to gain access to the encrypted data of the volume.

Figure 2:
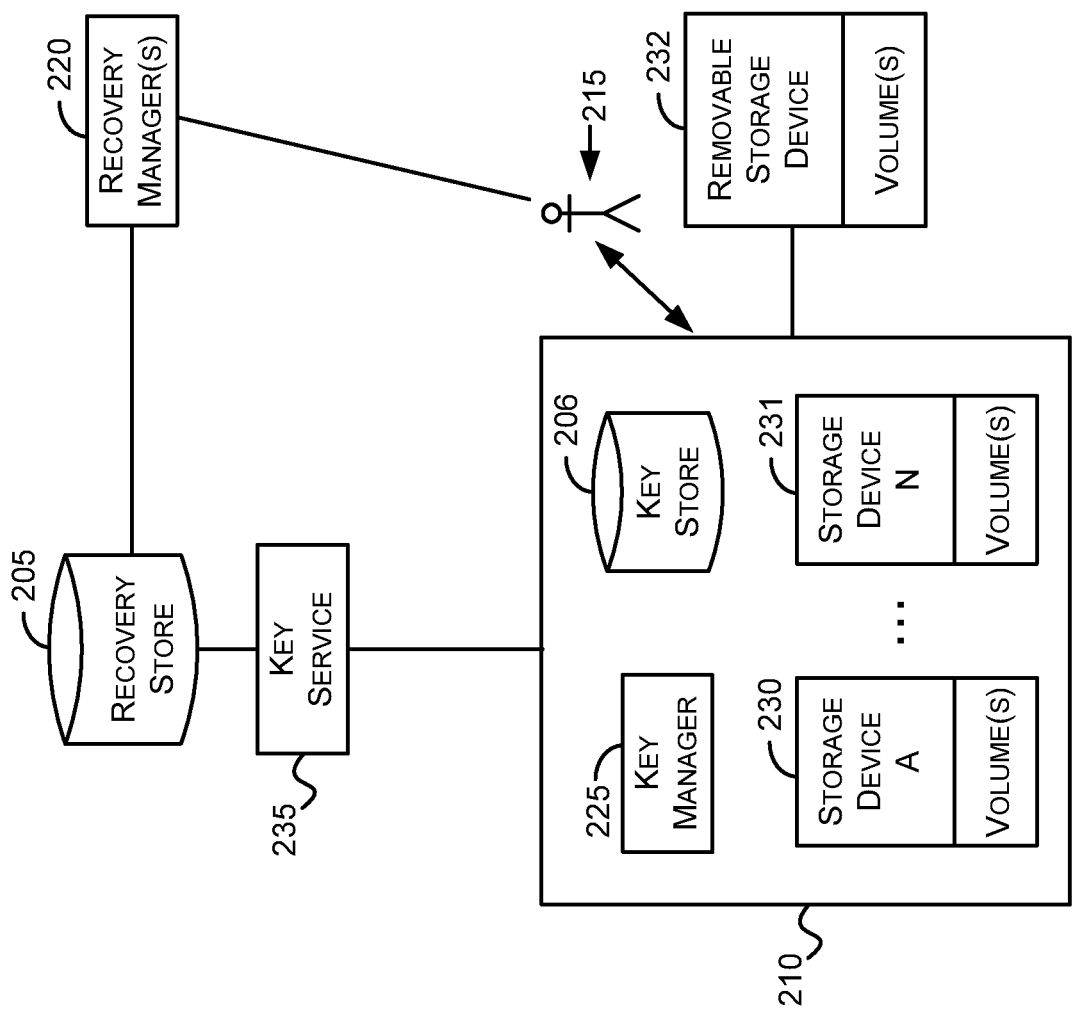
FIG. 2 is a block diagram that represents an exemplary environment in which aspects of the subject matter described herein may be implemented.

FIG. 2 is a block diagram that represents an exemplary environment in which aspects of the subject matter described herein may be implemented. The components illustrated in FIG. 2 are exemplary and are not meant to be all-inclusive of components that may be needed or included. In other embodiments, the components described in conjunction with FIG. 2 may be included in other components (shown or not shown) or placed in subcomponents without departing from the spirit or scope of aspects of the subject matter described herein. In some embodiments, the components and/or functions described in conjunction with FIG. 2 may be distributed across multiple devices.

As used herein, the term component is to be read to include hardware such as all or a portion of a device, a collection of one or more software modules or portions thereof, some combination of one or more software modules or portions thereof and one or more devices or portions thereof, and the like. A component may include or be represented by code.

One or more of the components illustrated in FIG. 2 may be implemented using one or more computing devices. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like. An exemplary device that may be configured to implement the components of FIG. 2 comprises the computer 110 of FIG. 1.

Turning to FIG. 2, the environment may include a recovery store 205, a secured device 210, a user 215, a recovery manager(s) 220, a key service 235, and other components (not shown). The secured device 210 may include a key manager 225, a key store 206, one or more storage devices 230-231, and other components (not shown) and may be attached to a removable storage device 232 and remote storage (not shown).

The recovery store 205 and the key store 206 may be implemented using any storage media capable of storing data. The storage media may include volatile memory (e.g., cache, RAM, and other volatile memory described in conjunction with FIG. 1) and nonvolatile memory (e.g., solid state storage, hard disk storage, and other nonvolatile memory described in conjunction with FIG. 1). The key store 206 may be external, internal, or include components that are both internal and external to the secured device 210. In one implementation, the key store 206 may be stored on one or more of the storage devices 230-232. The key store 206 may store an arbitrary but finite number of keys for each protected volume.

In one embodiment, each protected volume has its own key store and this key store is stored upon a storage device that includes the volume. In this embodiment, the key store for a volume may be accessible for consultation and lookup operations only when the volume is unlocked. In this embodiment, the key store may not visible or useable when a volume is locked, except to unlock the volume. Once a volume is unlocked, the key store of the volume may be enumerated and additional keys may be added to the key store of the volume.

The recovery store 205 may be used to store data that may be used to unlock volume(s) of secured devices. Data that may be used to unlock a volume allows the volume to be decrypted either directly or through a chain of keys as described in more detail below.

The term data is to be read broadly to include anything that may be represented by one or more computer storage elements. Logically, data may be represented as a series of 1's and 0's in volatile or non-volatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include information, program code, program state, program data, other data, and the like The recovery store 205 may store data of a database. The database may comprise a relational database, object-oriented database, hierarchical database, network database, other type of database, some combination or extension of the above, and the like. Data stored in a database may be organized in tables, records, objects, other data structures, and the like. The data stored in a database may be stored in dedicated database files, dedicated hard drive partitions, HTML files, XML files, spreadsheets, flat files, document files, configuration files, other files, and the like. A database may reference a set of data that is read-only to the database or may have the ability to read and write to the set of data.

Data in a database may be accessed via a database management system (DBMS). A DBMS may comprise one or more programs that control organization, storage, management, and retrieval of data of a database. A DBMS may receive requests to access data in a database and may perform the operations needed to provide this access. Access as used herein may include reading data, writing data, deleting data, updating data, a combination including two or more of the above, and the like. In one embodiment, the key service 235 may include a DBMS.

In describing aspects of the subject matter described herein, for simplicity, terminology associated with relational databases is sometimes used herein. Although relational database terminology is sometimes used herein, the teachings herein may also be applied to other types of databases including those that have been mentioned previously.

Although as illustrated in FIG. 2, only one secured device (i.e., the secured device 210) is shown, there may be an arbitrary number of secured devices associated with an organization. The recovery store 205 may store a recovery key value for each volume of each secured device of an organization. A recovery key value may be used to unlock an encrypted volume as described in more detail below.

The secured device 210 may be connected to one or more internal storage devices (e.g., the storage devices 230-231), to one or more removable storage devices (e.g., the removable storage device 232), and to one or more remote storage devices (not shown). The storage devices 230-231 may be housed inside the chassis of the secured device 210 while the removable storage device 232 may be connected to the secured device 210 through an interface whereby the removable storage device 232 is readily attached and unattached from the secured device 210. Remote storage devices may be connected to the secured device 210 via a network. The storage devices 230-232 and the remote storage devices, if any, may be implemented using, for example, types of computer storage media described in conjunction with FIG. 1.

Each storage device may be formatted with one or more volumes. A volume is a storage area on the storage device that is accessible by a file system. A volume is often included on a single partition of the storage device, but may span partitions, be contained in a file, or be otherwise represented without departing from the spirit or scope of aspects of the subject matter described herein.

Each volume of a storage device may be encrypted using an encryption key. The encryption key may be secured (e.g., encrypted) by another encryption key which may be secured by another encryption key and so forth. For example, an operating system volume may store encryption keys for non-operating system volumes hosted on the same device.

Multiple entities may have "property rights" in the data of an encrypted volume. The term "property rights" refers to a valid interest in obtaining the encrypted data of the volume in an unencrypted form. While in almost all cases a user who frequently uses the secured device 210 would have property rights in the data of a volume, other entities may also have property rights as well. For example, a company or other entity that owns the secured device 210, other users who also use the secured device 210, users who have the rights to logon to the secured device 210 (even if they have never logged on in the past), people who have created or updated documents that are stored on the secured device 210, and others may have property rights in the data of an encrypted volume. The term "stakeholder" is sometimes used to refer to an entity that has property rights to data stored on the volume.

In a regular logon, the secured device 210 may not decrypt data on a volume unless a user (e.g., the user 215) supplies the secured device 210 with valid credentials. Using the valid credentials and potentially other data, the secured device 210 may generate or otherwise obtain an encryption key that allows the secured device 210 to decrypt encrypted data that is stored on a volume.

There may occur times, however, when logon credentials may not be used to access protected data on a secured volume. For example, the secured device may enter into a recovery mode (as described below), there may be no users who can or will supply logon credentials to the secured device 210, the volume may be moved from one machine to another, or some other event may occur. At these times, a recovery protocol may be engaged in to obtain a key to unlock a volume of the secured device.

For example, the secured device 210 may enter recovery mode and deny access to the volumes 230-232 for any of a number of reasons. For example, if the BIOS, operating system, or other programs of the secured device 210 have been changed, if a user makes too many failed attempts to logon, if other configuration settings change, or if some other event occurs, the secured device 210 may deny access to the volumes 230-232 until recovery data is provided to the secured device 210.

If the secured device 210 enters a recovery mode, the secured device 210 may display a string (e.g., a recovery key identifier) that the user 215 is to provide to the recovery manager(s) 220. In response to providing the string and potentially stakeholder data, the recovery manager(s) 220 may provide a recovery key value that may be used to unlock a volume of the secured device 210.

If there are no users who can or will supply logon credentials to the secured device 210, a stakeholder may cause the secured device 210 to enter the recovery mode so that the stakeholder can unlock volume(s) on the secured device 210 using the mechanism above.

If a protected volume is removed or disconnected from the secured device 210 and connected to another computer, the other computer may not have a key with which to unlock the volume. To unlock the volume, a volume identifier may be supplied to the recovery manager(s) 220 which may use the volume identifier and potentially other data to obtain a key by which the volume may be unlocked.

In one embodiment, the recover manager(s) 220 may be implemented by a help desk person or the like who interfaces with a portal (e.g., a Web interface) or other user interface that interacts with the recovery store 205. The portal may display input elements (e.g., text boxes) for receiving various data (e.g., a volume identifier, a recovery key identifier, stakeholder data, and/or other data), receive input from the help desk person, and display a recovery key value if the inputted items match corresponding data in the recovery store 205.

The recovery manager 220 and the user 215 may communicate via telephone, network, e-mail, telegram, regular mail, or any other form of communication. The form of communication between the user 215 and a recovery manager may be chosen (e.g., by a business or other entity obtaining or providing the recovery).

In another embodiment, the recovery manager(s) 220 may be implemented as a component that receives data directly (e.g., via a Web service, user interface, or otherwise) from the user 215 and provides the recovery key value upon receiving the appropriate information (e.g., recovery key identifier, volume identifier, and/or potentially stakeholder data) from the user 215.

In one embodiment, the recovery manager(s) 220 may authenticate the user 215. This may be done, for example, by asking one or more challenge questions to which the user must respond, receiving a PIN, password, or other user-known data from the user, obtaining, with consent, biometric data (e.g., fingerprint, retina, DNA, or other biometric data), receiving a code from a portable item (e.g., a USB key, smart card, or the like), obtaining other credentials, a combination of two or more of the above, and the like. This information may authenticate that the user 215 is the stakeholder the user 215 represents the user 215 is.

It is not required that the recovery manager(s) 220 follow a key release procedure that is totally secure from social engineering or other attacks. For example, one key release procedure may include verifying that the communication comes from a company-trusted telephone number or other company-trusted communication endpoint and obtaining varying amounts of data in conjunction with obtaining a key recovery value from the recovery store 205. The varying amounts of information may be as little as a recovery key identifier or even another identifier (e.g., volume identifier, serial number, asset number, owner or user name, or the like) that identifies a protected volume.

In the recovery store 205, a recovery key value may be part of a tuple that associates the recovery key value with other data. For example, the recovery store 205 may associate a recovery key value with a machine identifier, a volume identifier, stakeholder data, a recovery key identifier, a name of a computer/device that sent the above data, or other data described below. One or more portions of the data associated with the recovery key value may be used to find and obtain the recovery key value from the recovery store 205. The recovery key value may then be used to unlock the associated volume.

The machine identifier may identify the secured device 210. For example, the machine identifier may be encoded in hardware or stored in nonvolatile memory of the secured device 210. This machine identifier may serve to distinguish the secured device 210 from other secured devices, if any.

The volume identifier may identify a volume of the secured device. The volume identifier may be a string, number, or other data that identifies a volume. In one embodiment, the volume identifier is sufficient to identify the volume even if the storage device that houses the volume is removed or disconnected from the secured device 210.

Stakeholder data identifies entities who are stakeholders of a volume. Stakeholder data may include any type of data that may be used to identify entities who are stakeholders of a volume. For example, stakeholder data may include logon facts such as domain names and user names of users. As another example, stakeholder data may include data that is derived from the logon facts through the use of a function. As another example, stakeholder data may include strings that have been assigned to identify users who are stakeholders.

The above examples of stakeholder data are not intended to be all-inclusive or exhaustive of the types of data that may be used to identify entities that are stakeholders of a volume. Based on the teachings herein, those skilled in the art may recognize many other types of data that may be used to identify stakeholders without departing from the spirit or scope of aspects of the subject matter described herein.

A recovery key identifier may include a string. This string may be displayed (e.g., on a display of the secured device 210) and responded to in a sequence of steps used to recover the recovery key value mentioned above. The recovery key identifier may be associated with a secured volume of the secured device 210. There may be a recovery key identifier associated with each secured volume of the secured device 210. Recovery key identifiers of different volumes may be different. In one embodiment, recovery key identifiers may also be different for a given prefix substring (e.g., the first eight characters). A recovery key identifier may be printable or transmittable in plain text.

A recovery key value may be used to unlock a volume. Unlocking a volume means that the recovery key value may be used directly or indirectly to decrypt the volume. For example, in one implementation, the recovery key value may be the actual encryption key that can be used to decrypt the volume. The length of the recovery key value may be configurable and may vary from implementation to implementation. In one implementation, the length may be 48 digits. The recovery key value may be printable or transmittable in plain text. Sometimes herein, the term key is used. Unless the context indicates otherwise, the term key is to be read as the recovery key value.

If the recovery key value is not the actual encryption key that was used to encrypt the volume, it may be used indirectly to decrypt the volume by being used in a chain of two or more keys to obtain the encryption key. For example, the recovery key value may be used as a key to obtain the encryption key, the recovery key may be used to obtain a key that can then be used to obtain the encryption key, or the recovery key may be used in a longer chain of obtaining keys to obtain the encryption key.

The key manager 225 may be in charge of managing keys for the secured device 210. Managing keys may include generating new keys, deleting old keys, providing key data to the key service 235 for storing on the recovery store 205, and the like.

For example, according to a policy, executable code, or otherwise, the key manager 225 may periodically and at other times determine if a new key is to be generated. A new key may need to be generated, for example, if a current key has been disclosed, if the current key may have been disclosed, if a period of time has elapsed since the current key was first generated, or for other reasons. Disclosure of a key may include one or more of providing the key to any entity, providing the key to a user in physical proximity of the secured device 210, disclosing the key orally, in a written format (e.g., via e-mail or other electronic means), disclosing the key to an entity who could reasonably use it to unlock the locked volume, and the like. If a new key is to be generated, the key manager 225 may generate a new key and send the new key to the key service 235 for storing in the recovery store 205.

For example, the key manager 225 may determine that a new key is to be generated by actions, including:

1. Detecting from data local to the secured device 210 that a new key needs to be generated. For example, the key manager may determine that the secured device 210 has been turned on, that an operating system of the secured device 210 has booted, and that a volume of the secured device 210 has been unlocked via the current key. In one implementation, this test may be reduced to detecting that a volume of the secured device 210 has been unlocked via the current key. For example, in some implementations, a component of the secured device 210 may indicate whether a volume has been unlocked by using the current key or unlocked by supplying credentials to an operating system. In those implementations, the key manager 225 may detect that a volume has been unlocked by a current key by querying or being informed by the component above.

2. Communicating with the key service 235 to determine that the current key has been disclosed. The recovery store 205 may store disclosure data (e.g., a flag, field, or other data) that indicates whether a key has been disclosed for a volume. For example, the key manager 225 may ask the key service 235 for disclosure data that indicates whether the current key has been disclosed. The key manager 225 may do this by sending a request(s) for disclosure data for each volume housed in or connected to the secured device 210. In one implementation, the request may include an identifier of each volume for which disclosure data is requested.

In response to the request, the key service 235 may send disclosure data that indicates a recovery key identifier for each key that has been disclosed for volumes connected to the secured device 210. The key manager 225 may then use the recovery key identifier(s), if any, to find and delete records in the key store 206 that include keys and their associated data. For example, in one embodiment, the key store 206 may include records that include one or more of: a recovery key identifier, a recovery key value, a volume identifier, a timestamp, and/or other data.

In various implementations, the communications between the key manager 225 and the key service 235 may vary. For example, in one implementation, the key manager 225 may select a protected volume connected to the secured device 210 and obtain an identifier of the volume. Then, for each key associated with the volume, the key manager 225 may obtain a recovery key identifier from the key store 206, and use the identifier in a request to the key service 235 to determine whether the recovery key value associated with the identifier has been disclosed. If the recovery key value has been disclosed, the key manager 225 may generate a new key (if one has not already been generated) and delete the record that includes the disclosed key identifier. After finding and deleting records for one secured volume, as needed, the key manager 225 may iterate to another protected volume and perform the steps above. This may continue until all protected volumes have been iterated over.

In another implementation, the key manager 225 may send a recovery key identifier for each key stored in the key store 206. In response, the key service 235 may indicate whether the key associated with the recovery key identifier has been disclosed. If the key has been disclosed and a new key has not been generated, a new key may be generated prior to deleting the disclosed key. If the key has been disclosed and a new key has been generated, the record for the disclosed key may be deleted from the key store 206.

In another implementation, the key manager 225 may ask the key service 235 if there has been disclosure of a key of a volume. In response, the key service 235 may search record(s) associated with the volume. If any record indicates disclosure of a key for the volume, the key service 235 may send data that indicates that at least one key for the volume has been disclosed.

In another implementation, one or more of the actions above may be performed in parallel, combined, executed in a different order, or otherwise performed without departing from the spirit or scope of aspects of the subject matter described herein.

3. Communicating with the key service 235 to determine that the current key is to be treated as if it were disclosed. In response to a crash or other system failure, the recovery store 205 may need to be restored from a backup data set. The backup data set may have been created recently or a relatively long time before the crash or other system failure. As a precaution to ensure that there are not disclosed keys that can still be used to unlock volumes, upon restore of the recovery store 205, each key may be marked as disclosed without regard to whether the key was actually disclosed. As secured devices communicate with the key service 235, this may cause the secured devices to generate new keys.

In one embodiment, the key service 235 may indicate via restore data to the key manager 225 that a restore of the recovery store 205 has occurred. In another embodiment, the key service 235 may provide similar functionality by marking each key as having been disclosed—regardless of whether the key actually was disclosed.

The implementations described above are not intended to be all-inclusive or exhaustive of possible implementations that may be used to determine that a current key has been or is to be treated as being disclosed. Based on the teachings herein, those skilled in the art may recognize other implementations that may be used without departing from the spirit or scope of aspects of the subject matter described herein.

In its operations with respect to keys, one exemplary sequence of actions that a key manager 225 may perform includes:

1. Determining that a new key is to be generated to protect a volume of a storage device;

2. Generating the new key;

3. Storing the new key in a local key store of a machine connected to the storage device upon which the volume is stored;

4. Sending a message to add the new key to a database of the recovery store;

5. Receiving confirmation that the new key has been added to the database;

6. Deleting all old keys from the local key store; and

7. Sending a message to the key service to delete any old keys for the volume that are stored on the database that are older than the new key.

Unfortunately, the key manager 225 or the key service 235 may crash, become disconnected, or become inoperable at any point during the actions above. Unless the context indicates otherwise, the term crash as used herein is used to describe an event in which the key manager 225 or the key service 235 stop functioning, become disconnected, become inoperable, or the like.

If the key manager 225 crashes any time before or during any of the actions above, upon restart, the key manager 225 may simply repeat the actions above. If the key manager 225 crashes multiple times, there may, for a time, be multiple keys for a volume stored in the key store 206 and perhaps in the recovery store 205. When the key manager 225 successfully completes the actions above, however, one key (the most recent one) for the volume may remain in the local key store 206 and a corresponding key may remain in the recovery store 205.

When there are multiple keys stored in the recovery store 205 for a protected volume, in one embodiment, the recovery manager(s) 220 may provide just the most recent key. Because of the sequence of steps outlined above, the protected volume will be able to be unlocked by this key even if the key manager 225 or the key service 235 crash during, before, or after, any of the steps above.

In another embodiment, when there are multiple keys stored in the recovery store 205 for a protected volume and multiple keys stored in a key store 206 for the volume, the user 215 may present multiple possible recovery key identifiers to the recovery manager(s) 220. The recovery manager(s) 220 may allow the user 215 to present more than one recovery key identifier at a time or may only accept one recovery key identifier at a time. The recovery manager(s) may use each identifier that is presented to attempt to find a recovery key value.

Figure 3:
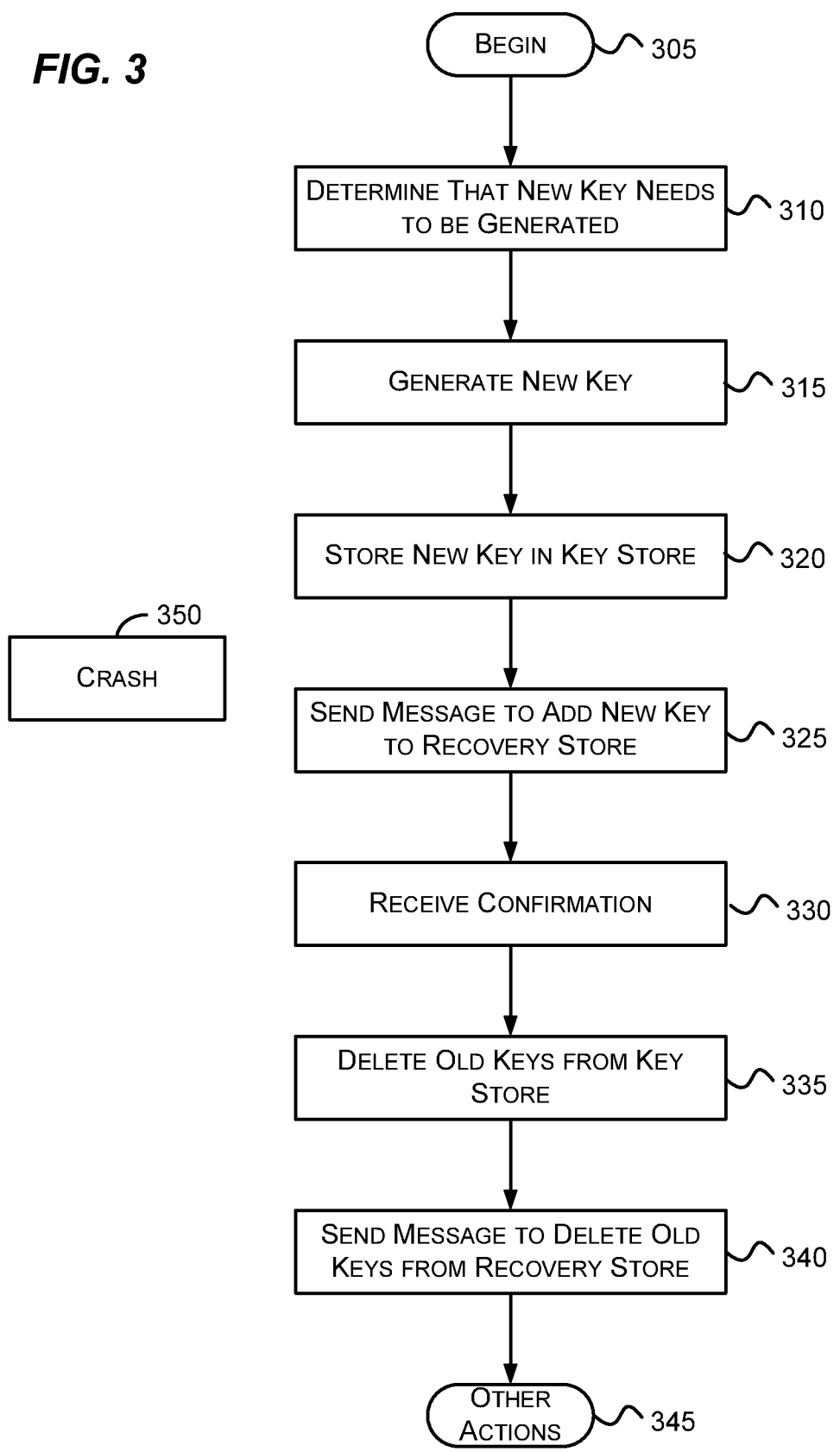
FIG. 3 is a flow diagram that generally represents exemplary actions that may occur on a secured device in accordance with aspects of the subject matter described herein.
Figure 4:
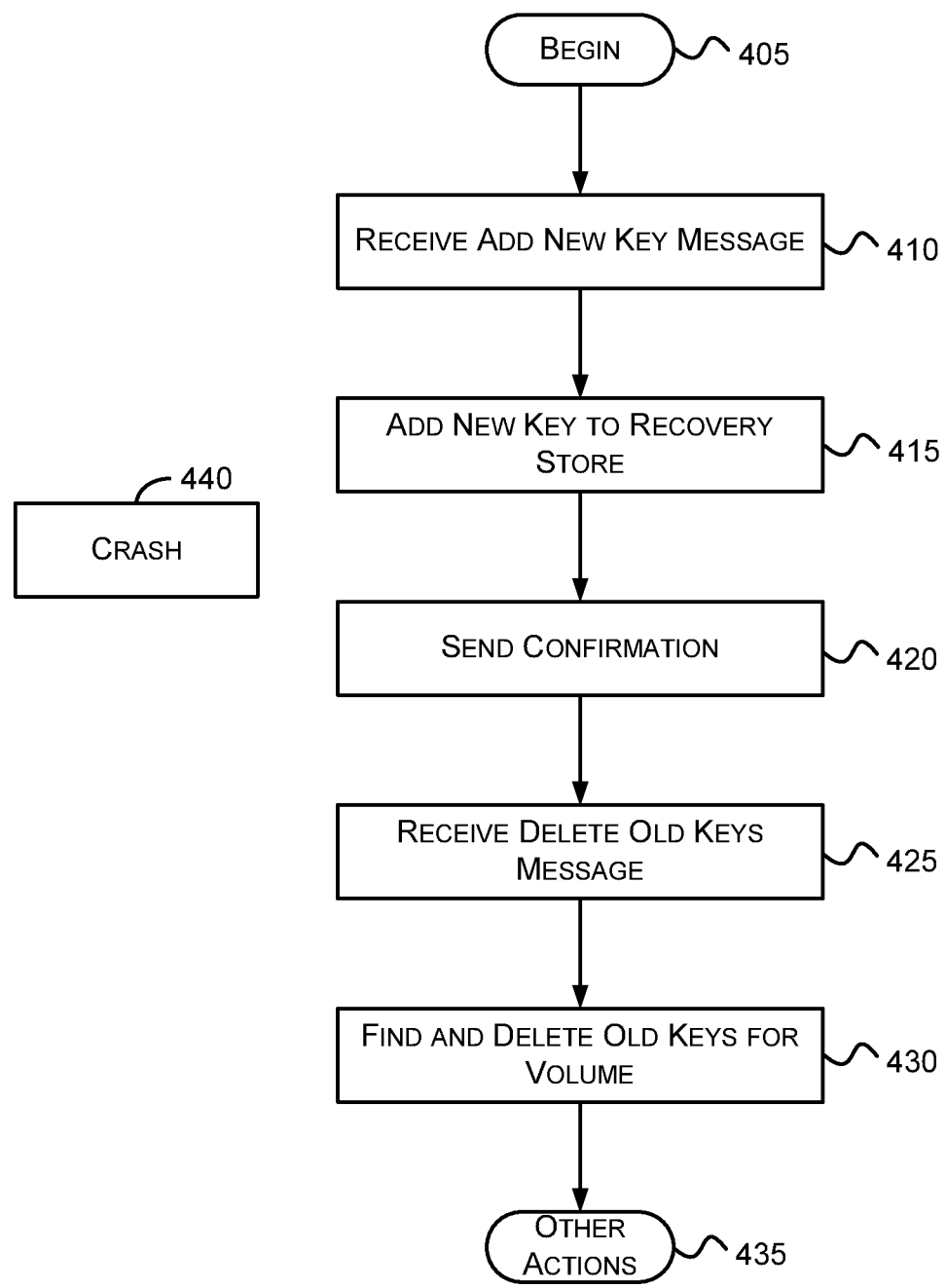
FIG. 4 is a flow diagram that generally represents exemplary actions that may occur on a system hosting a recovery store in accordance with aspects of the subject matter described herein.
Figure 5:
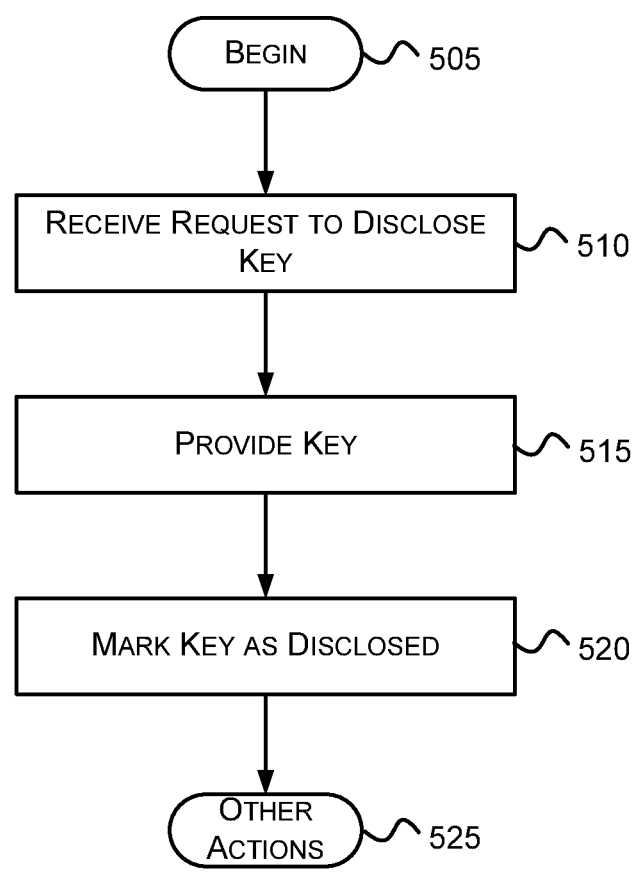
FIG. 5 is a flow diagram that generally represents exemplary actions that may occur in conjunction with disclosing a key in accordance with aspects of the subject matter described herein.

FIGS. 3-5 are flow diagrams that generally represent exemplary actions that may occur in accordance with aspects of the subject matter described herein. For simplicity of explanation, the methodology described in conjunction with FIGS. 3-5 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events FIG. 3 is a flow diagram that generally represents exemplary actions that may occur on a secured device in accordance with aspects of the subject matter described herein. At block 305, the actions begin.

At block 310, a determination is made that a new key needs to be generated for a volume of a storage device. The volume may already be protected by a current key and encrypted. For example, referring to FIG. 2, the key manager 225 may determine that a new key is to be generated to protect a volume of the storage device 230. This determination may include, for example:

1. Detecting that the volume has been unlocked via the current key via data of the secured device 210. For example, a component of the secured device 210 may provide data that indicates that the volume was accessed by using the current key, instead of through a regular logon routine;

2. Obtaining disclosure data from a recovery store where the disclosure data indicates that the current key has been or is to be treated as being disclosed; or 3. Obtaining restore data that indicates that the database has been restored. The restore data may indicate that the new key is to be generated regardless of whether the current key has been disclosed. The restore data may be provided as a return code or other data.

At block 315, a new key is generated. For example, referring to FIG. 2, the key manager 225 may obtain/generate a new value of the appropriate size, length, and other characteristics to be a new key to protect a volume of the storage device 230.

At block 320, the new key is stored in the key store. For example, referring to FIG. 2, the new key may be stored in the key store 206 (sometimes referred to as a local store) of the secured device 210. At this point the new key and one or more old keys may be stored in the key store 206.

At block 325, a message may be sent to add the new key to a recovery store. For example, referring to FIG. 2, the key manager 225 may send a message to the key service 235 to add the new key to the recovery store 205. In addition to the key, the data may include other data associated with the key such as the recovery key identifier, volume identifier, machine identifier, and other data described previously.

At block 330, a confirmation is received that the new key has been added to the recovery store. For example, referring to FIG. 2, the key manager 225 may receive a message from the key service 235 that confirms that the new key has been added to the recovery store 205. If there is not a crash, the confirmation may be received relatively quickly. A confirmation may include a message that responds to the message sent at block 325, a message that does not respond directly to the message at block 325, but that indicates that the new key is stored on the recovery store 205, or any other data that indicates that the new key is stored on the recovery store 205.

For example, if a crash occurs, the confirmation may be sent later when the key manager 225 is querying the key service 235 for key identifiers for keys for a volume and the key service 235 sends the key identifier of the new key. This act is considered as one of the ways in which confirmation may be sent even after a crash has occurred.

At block 335, old keys are deleted from the key store. For example, referring to FIG. 2, the key manager 225 deletes all keys for the volume except for the new key. In one embodiment, deleting "old keys" for a volume means deleting every key for the volume that is not the new key—even if an "old key" was added more recently than the new key. In another embodiment, deleting "old keys" for a volume means deleting keys that were added to the key store less recently than the new key.

At block 340, a message is sent to delete old keys from the recovery store. For example, referring to FIG. 2. The key manager 225 may send a message to the key service 235 to delete any old keys for the volume from the recovery store 205.

At block 345, other actions, if any, may be performed.

At block 350, a crash may occur before, during, or after any actions described above. For example, a crash may occur prior to the sending a message to add the new key to a database of a recovery store. In this example, after rebooting the secured device, data may be obtained from the recovery store that indicates that the new key was not stored in the database. In response to this, the new key may be deleted from the key store. In addition, after rebooting, a second new key may be generated and sent to the key service for storing in the recovery store.

As another example, a crash may occur after sending a message to add the new key to a database of a recovery store but prior to the receiving confirmation that the new key has been added to the database. In this example, after restarting, confirmation may be received that the new key has been added to the database in response to a query to the key service as indicated previously.

If the secured device 210 enters into recovery mode, a recovery key identifier may be displayed that is associated with the most recent key (e.g., the new key) used to protect the volume. The user 215 may provide this key to the recovery manager(s) 220 which may then provide a recovery key value (e.g., the new key) that may be used to unlock the volume.

FIG. 4 is a flow diagram that generally represents exemplary actions that may occur on a system hosting a recovery store in accordance with aspects of the subject matter described herein. At block 405, the actions begin.

At block 410, a message to add a new key for a volume is received. For example, referring to FIG. 2, the key service 235 receives a message from a requestor (e.g., the key manager 225) to add a new key for a protected volume of the storage device 230.

At block 415, the new key is added to the recovery store. For example, referring to FIG. 2, the key service 235 adds the received new key to a database that implements the recovery store 205. The new key is added while retaining (e.g., not deleting) the current key as a crash may occur in which the current key is needed.

At block 420, a confirmation is sent that the new key has been added to the recovery store. For example, referring to FIG. 2, the key service 235 may send a confirmation to the key manager 225 to indicate that the new key has been added to the recovery store 205.

At block 425, a message is received to delete old keys for the volume from the recovery store 205. For example, referring to FIG. 2, the key service 235 may receive a message to delete any keys older than the new key.

At block 430, records older than the new record may be found and deleted. For example, in response to the message received at block 425, the key service 235 may search the recovery store 205 for records associated with the volume that have timestamps that indicate that the records were added before the record. The key service 235 may then cause that these records are deleted from the recovery store 205.

At block 435, other actions, if any, may be performed.

At block 440, a crash may occur before, during, or after any actions described above. For example, referring to FIG.

2, the key service 235 may crash after receiving the message to add a new key but prior to sending confirmation that the new key has been added to the recovery store 205. After restarting, the key service may send a message that indicates that the new key has been added to the recovery store 205. The message may be in response to a request for recovery key identifiers for the volume or may be sent proactively.

FIG. 5 is a flow diagram that generally represents exemplary actions that may occur in conjunction with disclosing a key in accordance with aspects of the subject matter described herein. At block 505, the actions begin.

At block 510, a request to disclose a key is received. For example, referring to FIG. 2, the recovery manager(s) 220 may request a key from the recovery store 205. This request may be received by a component (not shown) that governs key disclosure. A recovery manager may send a request for a recovery key value for a volume. In response, the recovery store 205 may be searched for the most recent recovery key value for the volume which may then be provided to the recovery manager.

At block 515, assume the request is received from the appropriate entity, the key is provided in response to the request. For example, after verifying that the request comes from an authorized entity (e.g., an authorized recovery manager), a component that governs key disclosure may provide the key to the authorized entity.

At block 520, the key is marked as disclosed. For example, referring to FIG. 2, in conjunction with disclosing the key to the recovery manager(s) 220, a record in the recovery store 205 may be updated to indicate that the key has been disclosed.

At block 525, other actions, if any, may be performed.

As can be seen from the foregoing detailed description, aspects have been described related to disclosing recovery keys. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method for improving protection of data on a computing
device, the method comprising:
   determining, by a key manager executing on the computing device, that a current recovery key associated with unlocking an encrypted volume has been disclosed, the encrypted volume being separately accessible with either the current recovery key or with a current encryption key that differs from the current recovery key;
   generating, by the key manager, a new recovery key based on the determining;
   storing, by the key manager, the new recovery key on a local store of the computing device, wherein the computing device is communicationally connected to a storage device that comprises the encrypted volume;
   deleting, by the key manager, from the local store, at least one recovery key associated with the encrypted volume that is older than the new recovery key;
   sending, from the key manager, a message that adds the new recovery key to a database of a recovery store external to the computing device, the recovery store including recovery keys usable to unlock corresponding encrypted volumes if access to the corresponding encrypted volumes is denied or compromised; and
   receiving, at the computing device, confirmation that the new recovery key has been added to the database.

2. The method of claim 1, wherein the determining that the current recovery key has been disclosed is based on detecting that the encrypted volume has been unlocked by the current recovery key instead of the current encryption key.

3. The method of claim 1, wherein the determining that the current recovery key has been disclosed is based on obtaining disclosure data from the database indicating that the current recovery key has been disclosed.

4. The method of claim 3, wherein the database indicates that all recovery keys stored thereon have been disclosed because of a restore of the database.

5. The method of claim 1, further comprising crashing prior to the sending a message to add the new recovery key to the database, and, after rebooting the machine, obtaining data from the database that indicates that at least one recovery key for the encrypted volume has been disclosed, and in response, deleting the new recovery key from the local store.

6. The method of claim 5, further comprising:
   generating a newer recovery key with which to protect the volume;
   storing the newer recovery key on the local store prior to the deleting the previously generated new recovery key on the local store;
   sending a message to add the newer recovery key to the database; and receiving confirmation that the newer recovery key has been added to the database;
   wherein the deleting the previously generated new recovery key from the local store occurs after the receiving confirmation that the newer recovery key has been added to the database.

7. The method of claim 1, further comprising: in response to the receiving confirmation that the new recovery key has been added to the database, performing actions, comprising: deleting all recovery keys from the local store for the encrypted volume other than the new recovery key; and sending a message to delete any recovery keys for the encrypted volume that are stored on the database that are older than the new recovery key.

8. A computing device comprising: at least one processor and a memory, the at least one processor configured to:
   receive a message to add a first recovery key for an encrypted volume to a database;
   add the first recovery key to the database;
   receive a request for the first recovery key; find, in response to the request, a most recent recovery key value for the encrypted volume;
   subsequently provide the first recovery key if the first recovery key is the most recent recovery key; indicate, in the database, in response to the provision of the first recovery key, that the first recovery key has been disclosed; and mark each recovery key in the database as disclosed due to the database being restored from a backup thereof irrespective of whether any recovery key in the database was actually provided to a requestor.

9. The computing device of claim 8, wherein adding the first recovery key to the database comprises adding a first record to the database, the first record including a first recovery key identifier, a first recovery key value, and a first timestamp, the first timestamp indicating when the first record was added.

10. The computing device of claim 9, wherein the at least one processor is further configured to receive a request to delete from the database any recovery keys for the encrypted volume other than the first recovery key and in response thereto, search the database for records associated with the encrypted volume, and delete the records.

11. The computing device of claim 8, wherein the computing device crashes after receiving the message to add the first recovery key but prior to sending a confirmation that the first recovery key has been added to the database, and wherein further, after restarting after the crash, mark the first recovery key as having been disclosed.

12. In a computing environment, a system, comprising:
a computing device having a locked volume, the locked volume residing on a storage device connected to the computing device, the locked volume being separately accessible by either a current encryption key or by a current recovery key that differs from the current encryption key;
a key store that includes the current encryption key;
and a key manager, including processor-executable instructions that when executed on a processor perform actions, the actions including:
determining that the current recovery key has been disclosed;
generating a new recovery key based on the determining;
storing the new recovery key in the key store; deleting, from the key store, at least one recovery key associated with the encrypted volume that is older than the new recovery key;
sending a message to add the new recovery key to a database of a recovery store external to the computing device, the recovery store including recovery keys usable to unlock corresponding locked volumes if access to the corresponding locked volumes is denied or compromised; and receiving confirmation that the new recovery key has been added to the database.

13. The system of claim 12, wherein the key manager is further operable to perform actions including: receiving confirmation that the new recovery key has been added to the database; and in response to the receiving the confirmation, deleting any recovery keys associated with the volume from the key store other than the new recovery key.

14. The system of claim 13, wherein the key manager is further operable to perform actions including: in response to receiving the confirmation, sending a message to delete any recovery keys for the locked volume that are stored on the database that are older than the new recovery key.

15. The system of claim 12, wherein the key store is implemented via the storage device, the storage device housed in a chassis of the computing device and wherein the recovery store is hosted by a machine external to the computing device.

16. The system of claim 12, wherein the key store includes at least one recovery key for each locked volume connected to the computing device, each recovery key associated with a timestamp that indicates an order in which they were added to the key store.

17. A computer-implemented method, the method comprising: protecting data stored on a device such that the protected data can be accessed with either a current encryption key or a current recovery key that differs from the current encryption key;
determining that the current recovery key has been disclosed;
generating a new recovery key based on the determining;
storing the new recovery key on a local store of a machine connected to the device;
deleting, from the local store, at least one recovery key associated with the protected data that is older than the new recovery key sending a message to add the new recovery key to a recovery store, the recovery store comprising one or more recovery keys associated with the protected data that are used to provide access to the data when access to the data is otherwise denied or compromised; and receiving confirmation that the new recovery key has been added to the recovery store.

18. The computer-implemented method of claim 17, wherein the determining that the current recovery key has been disclosed is based on detecting restoration of the recovery store.

19. The computer-implemented method of claim 17, wherein the determining that the current recovery key has been disclosed is based on detecting denial of access to the data based on the device entering a recovery mode.

20. The computer-implemented method of claim 17, wherein the determining that the current recovery key has been disclosed is based on determining that no user can supply valid logon credentials to the locked data.

21. The computer-implemented method of claim 17 further comprising:
deleting from the recovery store, recovery keys associated with the protected data that are older than the new recovery key.

22. A computer system, comprising:
a processor;
a device for storing data protected such that the protected data can be accessed with either a current encryption key or a current recovery key that differs from the current encryption key;
a key store coupled to the secured device, the key store having the current encryption key;
a recovery store coupled to the secured device, the recovery store having one or more recovery keys that can provide access to the protected data when access to the protected data is determined to be compromised, the one or more recovery keys comprising the current recovery key; and
a memory for storing a key manager, the key manager having instructions that when executed on a processor, generate a new recovery key upon detection that the current recovery key has been disclosed, store the new recovery key in the key store, deletes from the key store at least one recovery key associated with the protected data that is older than the new recovery key, and facilitate storage of the new recovery key in the recovery store, the facilitating comprising receiving confirmation that the new recovery key has been added to the recovery store.

23. The computer system of claim 22, further comprising:
a key service having instructions that when executed on a processor, receives the new encryption key and stores the new encryption key in the recovery store.

24. The computer system of claim 22, wherein the recovery store includes disclosure data that indicates whether access to the protected data has been compromised.

25. The computer system of claim 22, wherein the detection that the current recovery key has been disclosed comprises determining that the recovery store has been compromised.

* * * * *